(12) United States Patent
Violleau et al.

(10) Patent No.: US 7,739,731 B2
(45) Date of Patent: Jun. 15, 2010

(54) METHOD AND APPARATUS FOR PROTECTION DOMAIN BASED SECURITY

(75) Inventors: Thierry Violleau, Poissy (FR); Tanjore S. Ravishankar, San Jose, CA (US); Matt Hill, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 968 days.

(21) Appl. No.: 11/507,872

(22) Filed: Aug. 21, 2006

(65) Prior Publication Data
US 2010/0024016 A1    Jan. 28, 2010

Related U.S. Application Data

(60) Provisional application No. 60/757,735, filed on Jan. 9, 2006.

(51) Int. Cl.
*G06F 9/00* (2006.01)
(52) U.S. Cl. .............................. 726/14; 726/11; 713/151; 713/154; 713/156
(58) Field of Classification Search .................. 726/14, 726/11; 713/151, 154, 156
See application file for complete search history.

(56) References Cited

U.S. PATENT DOCUMENTS

| | | | | |
|---|---|---|---|---|
| 6,125,447 | A * | 9/2000 | Gong | 726/17 |
| 6,282,652 | B1 * | 8/2001 | Scheifler | 726/14 |
| 6,708,276 | B1 * | 3/2004 | Yarsa et al. | 726/6 |
| 6,993,665 | B2 * | 1/2006 | Heddings et al. | 726/21 |
| 7,051,366 | B1 * | 5/2006 | LaMacchia et al. | 726/14 |
| 2003/0172109 | A1 * | 9/2003 | Dalton et al. | 709/203 |
| 2004/0006706 | A1 * | 1/2004 | Erlingsson | 713/200 |
| 2004/0088562 | A1 | 5/2004 | Vassilev et al. | |
| 2004/0216150 | A1 | 10/2004 | Scheifler et al. | |
| 2006/0036570 | A1 * | 2/2006 | Schaefer et al. | 707/1 |

FOREIGN PATENT DOCUMENTS

EP           1 431 862 A2    6/2004
WO    WO 2005/045735 A1    5/2005

OTHER PUBLICATIONS

Author: Li Gong and Roland Schemers Title: Implementing Protection Domains in Java Development 1.2 Date: 2003.*

(Continued)

*Primary Examiner*—Thanhnga B Truong
(74) *Attorney, Agent, or Firm*—Osha • Liang LLP

(57) ABSTRACT

A first application instance is associated with a protection domain based on credentials (e.g.: a signed certificate) associated with a set of application code that, when executed, gives rise to the application instance. The first application instance executes in a first execution context. An indication is received that the first application instance seeks access to protected functionality associated with a second execution context. In response to receiving the indication, a determining is made as to whether the first application instance has permission to access the protected functionality. The determination is made by determining the protection domain with which the first application instance is associated, and determining if the protection domain with which the first application instance is associated is in the set of one or more protection domains.

12 Claims, 6 Drawing Sheets

OTHER PUBLICATIONS

Author: Zhiqun Chen Title: Java card technology for smart cards: Architecture and Programmer's Guide Date: Sep. 18, 2000.*

Gong, L. et al., "Implementing Protection Domains in the Java™ Development Kit 1.2", Proceedings of the Internet Society Symposium on Network and Distributed System Security, XP-002304112, Mar. 1988, 10 pages.

Gong, L. et al., "Going Beyond the Sandbox: An Overview of the New Security Architecture in the Java™ Development Kit 1.2", Proceedings of the Usenix Symposium on Internet Technologies and Systems, XP-002250254, Dec. 1997, 10 pages.

Gong, L. et al., "Java Security Architecture (JDK 1.2)", Internet Citation, XP-002171445, dated Dec. 6, 1998, 62 pages.

European Patent Office, "European Search Report", European application No. 07250044.0-2212, received Nov. 30, 2007, 10 pages.

Claims, European application No. 07250044.0-2212, 5 pages.

Chen, Zhiqun, "Applet Firewall and Object Sharing," Chapter 9 of *Java Card Technology for Smart Cards: Architecture and Programmer's Guide*, published by Addison Wesley, Jun. 2000, pp. 105-127.

Knudsen, Jonathan, "What's New in MIDP 2.0," Sun Microsystems, retrieved from the internet at http://developers.sun.com/techtopics/mobility/midp/articles/midp20/, retrieved on Jan. 10, 2007, 8 pages.

Ortiz, Enrique C., "An Introduction to Java Card Technology—Part 1," Sun Microsystems, retrieved from the Internet at http://developers.sun.com/techtopics/mobility/javacard/articles/javacard1/, retrieved in Jan. 10, 2007, 16 pages.

European Patent Office, "Communication pursuant to Article 94(3) EPC", Application No. 06256576.7-2212, dated Jul. 17, 2008, 4 pages.

Claims, Application No. 06256576.7-2212, 3 pages.

European Patent Office, "Communication pursuant to Article 94(3) EPC", Application No. 07250044-2212, dated Jul. 3, 2008, 1 page.

Claims, Application No. 07250044-2212, 3 pages.

* cited by examiner

METHOD AND APPARATUS FOR PROTECTION DOMAIN BASED SECURITY

CLAIM OF PRIORITY

This application claims benefit of Provisional Application Ser. No. 60/757,735, filed Jan. 9, 2006, entitled "Method and Apparatus for Protection Domain Based Security," by Violleau et al., the entire contents of which are incorporated by reference as if fully set forth herein.

BACKGROUND

There are many computing environments having multiple software applications that need to interact with each other and with other software such as libraries and runtime environments. Firewalls or the like are one technique to protect the applications or other software. One type of firewall is to execute each application (or bundle of applications) in its own execution context. For example, some computing environments support isolation of application execution contexts.

Isolation of application execution contexts means that an application cannot access objects or data owned by an application in another context unless the other application explicitly provides an interface for access. Context isolation may be enforced by a firewall. For example, access to an instance of an object is only allowed to applications executing in the same context the object instance was created in (the owning context). Applications can provide interfaces for other applications to access in the form of shareable interface objects (SIO), which bypass the firewalls. In addition to object ownership control, when an object is accessed, other language access controls may be enforced.

Context isolation allows for coarse-grained access control to protected data or objects. For example, the protected object or data could be associated with a platform such as a smart card. A smart card is a card that may resemble a credit card and contains an embedded integrated circuit (IC). Smart cards are highly secure by design, and tampering with one results in the destruction of the information it contains. Smart cards typically have microprocessors and memory for secure processing and storage. There also exists technology similar to smart cards, but in form factors other than smart cards. Examples of such related technology are smart buttons and USB tokens. These other technologies may be used for similar functions as smart cards. USB tokens can be plugged directly into the USB port of a PC. Smart buttons and USB tokes provide programming capabilities similar to smart cards and have tamper-resistance properties.

Thus, access to platform functionalities or functionalities or services provided by another application is granted solely based on the context of the calling application. For example, access to Runtime Environment (RE) functionalities or functionalities or services provided by another application is granted solely based on the context of the calling application. However, context isolation does not allow for fine-grained platform protection or application function protection enforced by the platform.

Under limited circumstances, finer grain control of security may be possible. For example, finer grain control may be possible by checking an application's identification. As a particular example, a server application can programmatically check if a smart card application client is one the server allows. However, this check is limited in that is typically only based on the identification of the application client.

Policy-based access control allows for protecting functionalities provided by the Runtime Environment (RE), an application or a library. The protected functionality may be a block of code that implements the protected functionality, a protected object in the sense of object-oriented programming, or protected data.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

An approach for providing security is described herein. According to one embodiment, a first application instance is associated with a protection domain based on credentials (e.g. a certificate) associated with a set of application code that, when executed, gives rise to the application instance. The first application instance executes in a first execution context, wherein the first execution context is isolated by a firewall from other execution contexts. An indication is received that the first application instance seeks access to protected functionality associated with a second execution context. Access to the protected functionality is allowed if the entity seeking access belongs to a protection domain in a set of one or more protection domains (granting the permission to access the above-mentioned protected functionality). In response to receiving the indication, a determination is made as to whether the first application instance has permission to access the protected functionality. The determination is made by determining the protection domain with which the first application instance is associated, and determining if the protection domain with which the first application instance is associated is in the set of one or more protection domains (granting the permission to access the above-mentioned protected functionality).

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

Figure 1A:
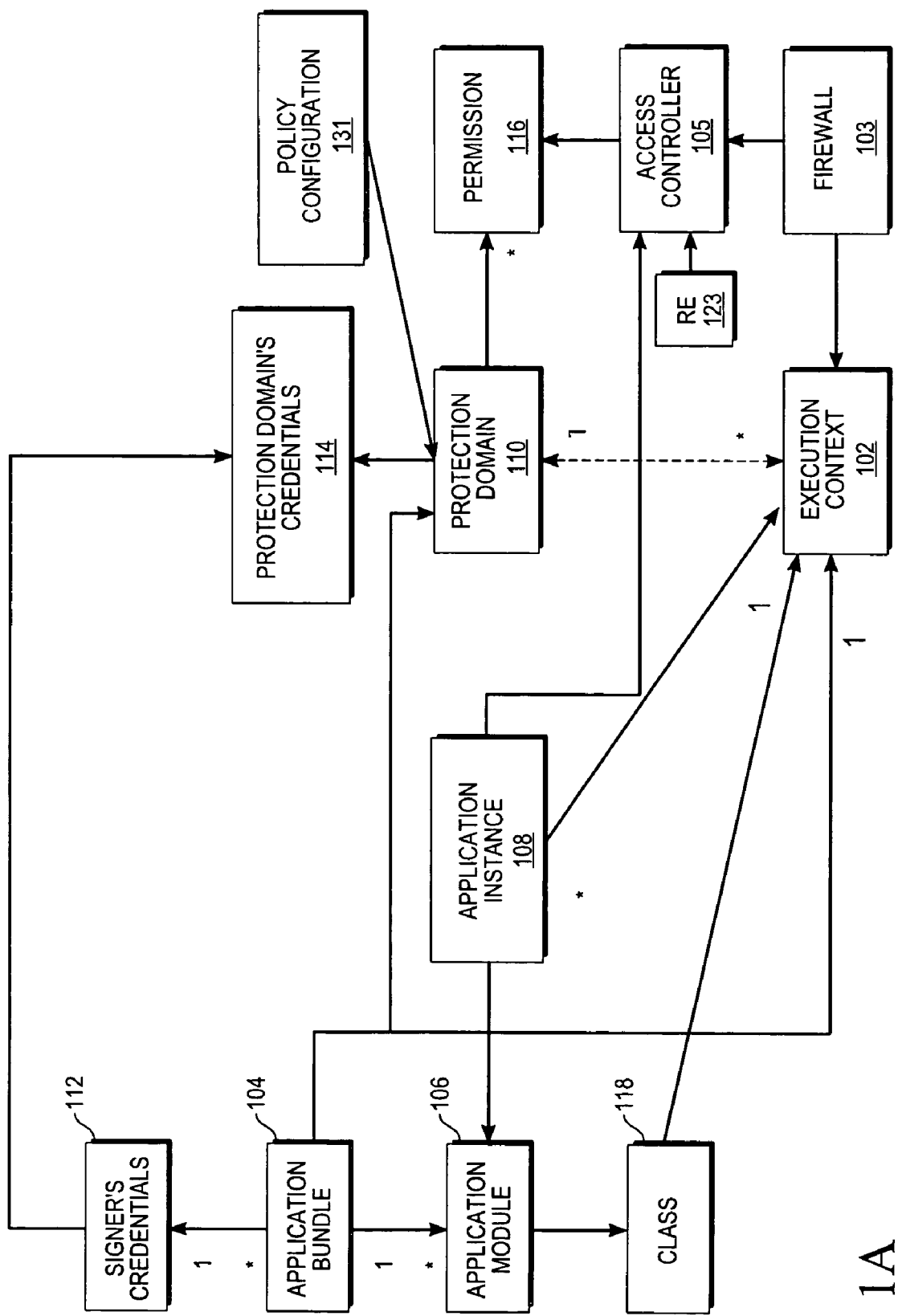
FIG. 1A is a block diagram illustrating relationships between elements relevant to protection domains used with context isolation, in accordance with an embodiment of the present invention.

The systems and methods described herein relate to protection domain based security using context isolation. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Security Model Overview

A security model in accordance with an embodiment of the present invention provides a protection domain-based security model with a context isolation-based security model. The security model may be provided for a Smart Card platform. However, the security model is not limited to a smart card platform. An example of a Smart Card platform is a Java® Card platform, but the present invention is not so limited.

In one embodiment, a successfully installed application is bound to a protection domain and an execution context. Therefore, a protection domain is indirectly associated with an execution context. Thus, seamless integration of a protection domain-based security model with context isolation-based security model is provided by an embodiment of the present invention.

In one embodiment, a protection domain-based security model includes permissions for platform objects, including platform functionalities. For example, the permissions may be related to a Runtime Environment (RE). However, the permissions may be applicable to other environments. As particular examples, permissions are provided that relate to threads, platform functionalities such as Shareable Interface Object (SIO) lookup, and library functionalities. An enhanced security model that supports fine granularity of permission checks with permission targets and permission actions is provided in accordance with an embodiment of the present invention.

An embodiment of the present invention is a method that grants access, on a per-application basis, to platform protected functionalities, library protected functionalities, and server application protected functionalities. In one aspect, the permission checks are performed transparently on SIOs at context switch-time. For example, a context switch occurs when an object associated with a first execution context seeks access to an object associated with a second execution context. A firewall automatically causes the permission check upon detecting the context switch, thereby causing a transparent permission check.

In another aspect, the permission checks on SIOs are performed explicitly (programmatically) by the application that owns the protected functionality. This allows the application to request additional permission checks. The programmatic permission checks allow fine granularity. The permission checks may also be performed explicitly (programmatically) on library protected functionality.

The programmatic permission checks are initiated by the application that owns the protected functionality invoking a method, in one aspect. In another aspect, programmatic permission checks are initiated based on developer-provided meta-data in the application that owns the protected functionality. The permission checks, whether transparent or programmatic, allow for many types of security constraint checking, such as checking authentication.

Protection Domain and Context Isolation Overview

FIG. 1A is a block diagram illustrating relationships between elements relevant to protection domains used with context isolation, in accordance with an embodiment of the present invention. A protection domain 110 defines a set of permissions 116 that may be granted to an application bundle 104. The protection domain 110 is described by the policy configuration 131. For example, the permissions 116 in the protection domain 110 can be specified by a GUI or the like in order to implement a security policy. A protection domain 110 is associated with protection domain credentials (e.g.: a certificate) 114. Protection domain credentials (e.g.: a root certificate) are credentials associated with a protection domain that are implicitly trusted by a device that may need to verify and authorize the application bundle 104.

When checking if the application instance 108 loaded from the application bundle 104 has permission to access a protected functionality (e.g., protected object), the permission check can be determined based on the protection domain to which the application bundle 104 belongs. For example, applications that belong to one of the protection domains in a set of protection domains are allowed to access the object.

Application bundles 104 are bound to protection domains 110 based on the application signer's credentials (e.g.: certificate) 112. Application bundles 104 should be signed with credentials 112 that can be authenticated against one of the protection domain credentials 114.

In order to install an application bundle, the application bundle should be authenticated to establish trust. This is an initial process that is separate from checking the permission of a successfully installed application during application execution. Signed application bundles may become trusted by authenticating the signer of the application bundle and binding the application bundle to a protection domain that will authorize the application bundle to perform protected functionalities by granting permissions allowed in the protection domain. In one embodiment, a signed application bundle can be authenticated if a certification path from/including the signer certificate to one of the protection domain root certificates can be found. Once authenticated, the application bundle requested permissions are compared to the protection domain permissions. The application bundle is installed and bound to the protection domain only if the set of permissions is a subset of the protection domain permissions.

An execution context 102 ("context") is created for each application bundle 104. One technique for creating an execution context is to assign the same context identifier to each object that is instantiated in the execution context, wherein the context identifier is unique from all other execution contexts. An execution context 102 may be secured by verifying that the context identifier of an application seeking access to an object in the execution context 102 matches the context identifier for the execution context 102. A firewall is used to implement this verification in one embodiment. The application bundle 104 may have one or more application modules 106. In one embodiment, a set of application modules 106 in the application bundle 104 (up to and including all modules 106) all execute in a common context 102. The run-time instance 108 of the application module (application instance) 108 executes in the execution context 102. Note that many application instances 108 associated with the application bundle 106 may execute in one execution context 102.

Note that the protection domain 110 is associated with the execution context 102 as a result of the association of the application bundle 104 to both the protection domain 110 and to the execution context 102. Further, note that there is a one-to-one relationship between the application bundle 104 and the execution context 102. However, there is a one-to-many relationship between the protection domain 110 and the execution contexts 102. Therefore, a particular protection domain 110 may be associated with many different application bundles 104.

The protection domain can thus protect based on which application seeks access to a protected functionality (e.g., object). That is, one application may be allowed to access a protected functionality (e.g., object), whereas another application is not, based on the respective protection domains of the applications. Further, the protection domain can protect based on the type of access sought, as discussed below under the section heading "permission targets and actions."

In one embodiment, when an application seeks access to protected functionality, the application's permissions 116 are checked by the access controller 105, which may be invoked by the firewall 103, the application instance 108, runtime environment (RE) 123, or other code.

Figure 1B:
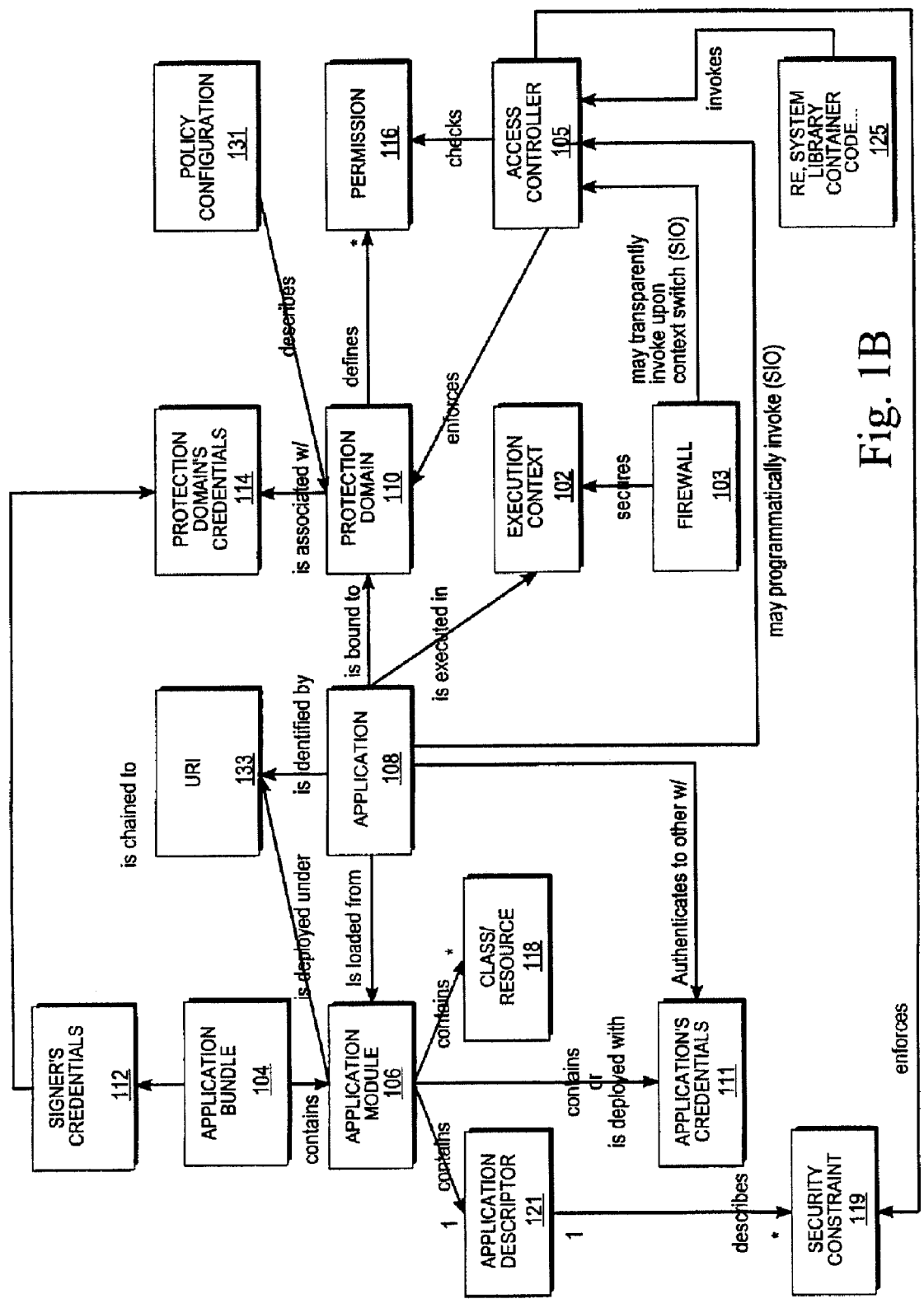
FIG. 1B is a block diagram illustrating relationships between elements relevant to protection domains used with context isolation, in accordance with another embodiment of the present invention.

Referring now to FIG. 1B, the application 108 authenticates to others with the application credentials 111. Each application in the application bundle 104, packaged as an individual application module, may be bound to a distinct application execution context preventing direct calls b/w application instances 108. Application execution contexts are discussed below. All the applications in the application bundle 104 are bound to a common protection domain 110. All the applications in the application bundle 104 may execute in a common context 102.

Referring still to FIG. 1B, the access controller 105 enforces the security constraint 119 that is described by the application descriptor 121. The access controller 105 may be invoked by the application 108, the firewall 103, or the runtime environment/system library/container code 125. FIG. 1B depicts that the application instance 108 is identified by the URI 133 and that the application bundle 104 is deployed under the URI 133.

Permission Overview

Permissions are checked transparently, in accordance with one embodiment. For example, permissions may be checked automatically upon a change in the execution context, as will be discussed more fully below. The firewall 103 check permissions transparently whenever access is sought to protected functionality from outside of the execution context of the protected functionality, in one aspect. As a particular example, if a first application instance executing in one context attempts to access an object exposed by an SIO of a second application instance executing in another context, the firewall that protects the second context automatically invokes permission checks against the first application.

Permissions may be checked programmatically, which can provide for fine-grained control, as will be discussed more fully below. For example, the application instance 108, runtime environment 123, library, or other code may check permissions programmatically. As a particular example, the previously mentioned second application instance can invoke a method to cause checking permissions against the first application instance. In accordance with one embodiment, a software method to programmatically request a permission check has three arguments: the name or type of the permission, an optional permission target and an optional permission action. Permission targets and actions are discussed in the following section. In accordance with one embodiment, the second application can specify the domain to which the first application must belong to access a functionality (e.g., object) that is exposed by the second application. In accordance with one embodiment, the second application can specify the URI or URI pattern the first application's URI must match to access a functionality (e.g., object) that is exposed by the second application. In accordance with one embodiment, the second application can specify the authentication scheme and credentials the first application's credentials must be validated against to access a functionality (e.g., object) that is exposed by the second application.

Permission Targets and Actions

Protection domain based permission checking supports checking permission targets in accordance with one embodiment. An example of a permission target is a permission to open an HTTPS connection to a particular host. As a particular example, the permission to open an https connection may be granted only for a particular target, such assun.com. Thus, the protection is not based on whether the application has general access to the functionality (e.g., object) needed to open the connection, but is based on the target to which the application seeks to open the connection.

Protection domain based permission checking supports checking permission actions in one embodiment. An example of a permission action is permission to open an HTTPS connection to using a GET or POST HTTP method. Thus, the protection is not based on whether the application has general access to the protected GET or POST method, but is based on the action the application takes using the protected method.

Application-, Platform-, and Library-Defined Permissions

Protection domain based permission checking supports application defined permissions, in accordance with one embodiment. For example, a first application can check permissions when a second application attempts to access an SIO that the first application exposes. There may also be non-SIO permissions that are application defined.

Protection domain based permission checking allows a platform defined permissions, in accordance with one embodiment. An example of a protected platform functionality is a permission for strong cryptography, such as, "javacardx.crypto.Cipher". Another protected platform functionality is a permission on sharable interface object (SIO) lookup.

Protection domain based permission checking supports library defined permissions, in accordance with one embodiment of the present invention. Permission checks on protected library functionalities may be requested programmatically. Libraries are not associated with a protection domain, in accordance with an embodiment of the present invention. However, a wrapper service is used to bind a library to a protection domain, in one embodiment. A library may be signed to allow the signer's credentials (e.g.: certificate) to be used in installation of the library. An example of a protected library functionality is a permission related to cryptography such as, "javacardx.crypto.Cipher.encrypt".

Application Execution Contexts

Figure 2:
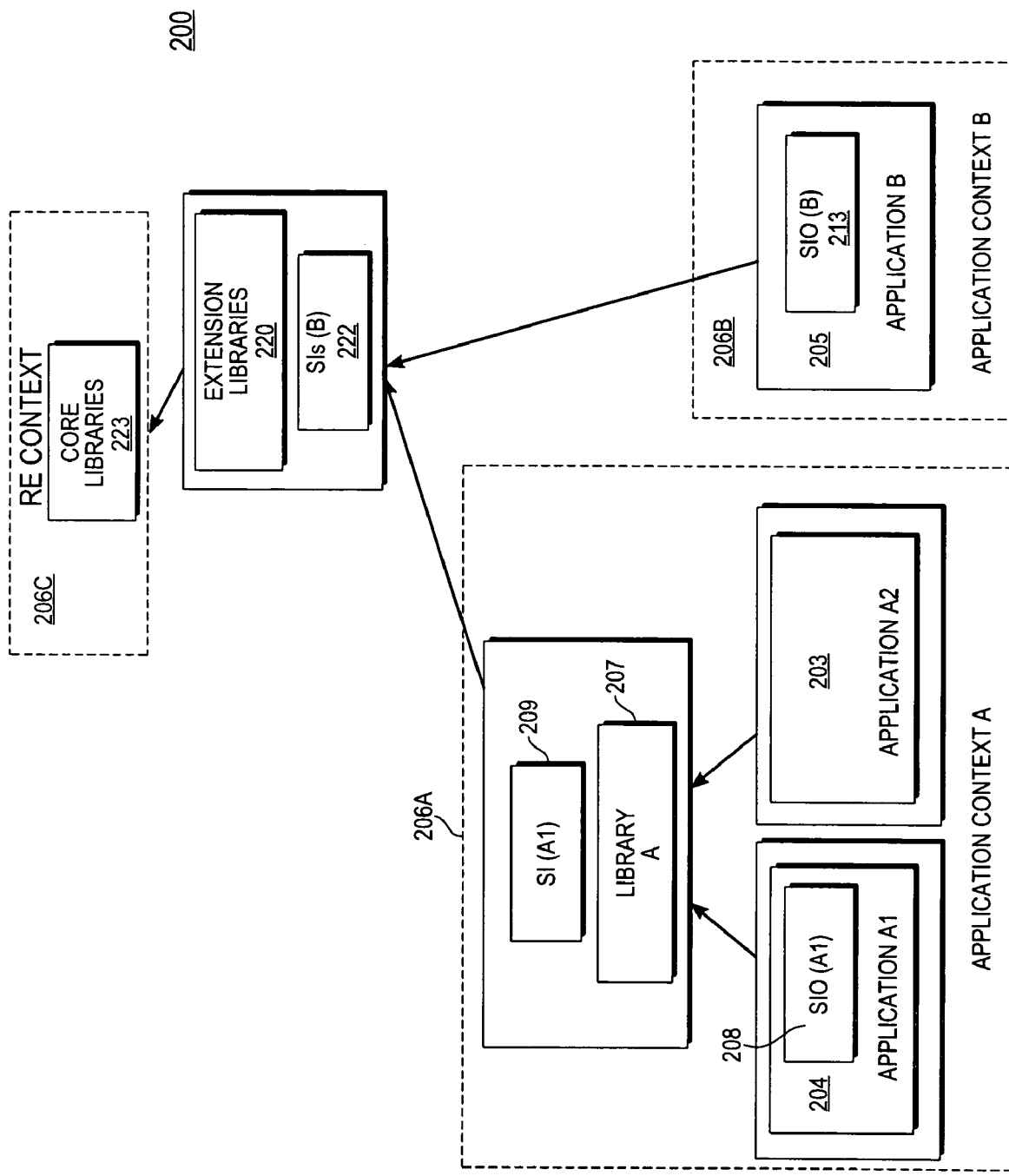
FIG. 2 is a diagram illustrating application bundles and associated contexts, in accordance with an embodiment of the present invention.

FIG. 2 is a diagram illustrating a platform 200 with application bundles with associated execution contexts, in accordance with an embodiment of the present invention. The diagram also illustrates the code isolation hierarchy which isolates the code of applications. Calls can only be executed as depicted by the arrows and new applications are installed so that they can only call commonly visible classes such as core libraries 223, extension libraries 220 and shareable interfaces for inter-application communications such as SIs B 222. Application bundle A has application A1 204, application A2 203, and Library A 207. Application bundle A has been deployed as one unit on the platform 200 and executes within application context A 206A. Within the application context A 206A, Application A1 204 exposes interface SI A1 209 for Application A2 203 to call SIO A1 208 of Application A1 201. The Intra SI(A1) 209 is a shareable interface demoted for intra application communications or a regular non-shareable interface. The context 206A in which the application bundle executes provides context isolation. The context isolation is implemented with a firewall, in one embodiment.

Application bundle B has application B 205 and is deployed on the platform as a single unit and executes in application context B 206B. Application B exposes interface SI B 222 for applications that execute in other contexts to access protected functionality SIO B 213.

There is a separate runtime environment (RE) context 206C. The RE context 206C is associated with RE and core libraries 223. Thus, the platform has context isolation, wherein each application bundle executes in a context that is isolated from other contexts. The context isolation is enforced by a firewall, in accordance with one embodiment.

Also depicted in FIG. 2 is an extension library 220, which is accessible by all applications and which is not tied to a particular execution context on the platform. Only when creating objects by instantiating classes from this library are the created objects associated to a specific context (e.g. The calling application's context).

Also depicted in FIG. 2 are shareable interfaces SIs B 222, which are exposed by application B 205 to other applications at a commonly visible level to allow them to call SIO B 213 for inter-application communications.

Permission Checks Based on Context Changes

Permissions may be checked when an application executing in one context seeks access to a functionality (e.g., an object) that is protected by another context. For example, the protected functionality may be platform or library functionalities or a protected Shareable Interface Object functionality. Permissions (for SIO or library functionalities) may be checked based on the context of the calling application. As previously discussed, a calling application may be granted permission on a target or category of targets. As also previously discussed, a calling application may be granted permission for an action or category of actions.

Figure 3:
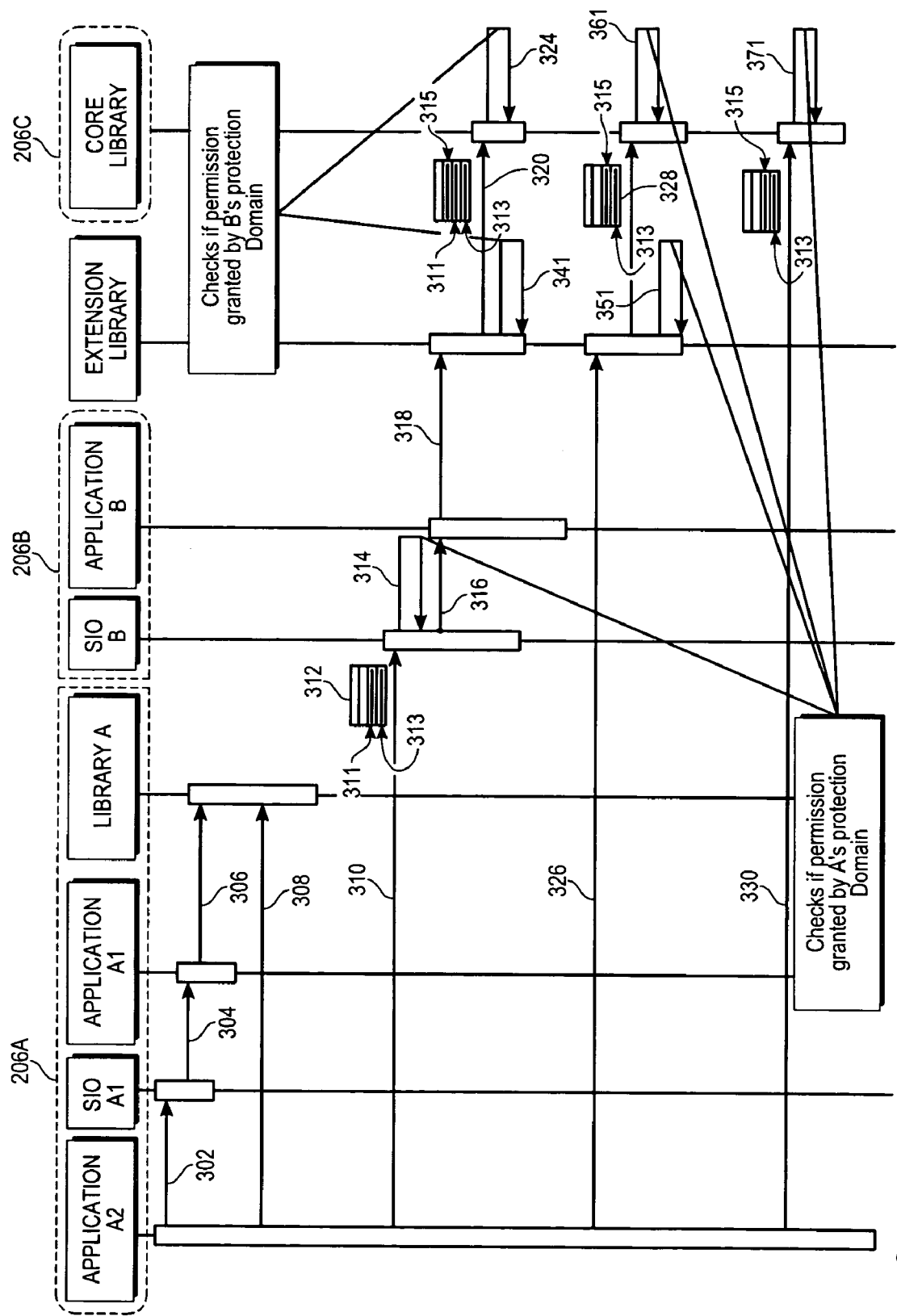
FIG. 3 is a diagram illustrating context changes and security checks for the applications and contexts depicted in FIG. 2, in accordance with an embodiment of the present invention.

FIG. 3 is a diagram illustrating context changes and security checks for the applications and contexts depicted in FIG. 2, in accordance with an embodiment of the present invention. Thus, there are three different contexts represented in FIG. 3. Those three contexts are context A 206A, context B 206B, and the RE context 206C. In particular, FIG. 3 depicts security checks made when context switches occur due to a context being penetrated.

Messages (calls) passed entirely within Application bundle A do not result in a context switch. Therefore, no security check is needed. For example, Application A2 calls Application A1 via SIO A1 (messages 302 and 304). Note that these messages (302 and 304) are passed within the context of Application A. Thus, there is no context switch associated with these messages (302 and 304). Therefore, there is not a security concern at this point. Application A1 calls Library function A, in message 306. Further, Application A2 calls Library A, in message 308. Because Library A functionalities execute in the same context A 206A, there is no need for a security check for calls to the Library A. Note that Library A is considered as being in context A 206A, thus no context switch occurs when Application A2 calls Library A.

However, when an application associated with one context attempts to access a functionality (e.g., an object) associated with another context, a context change is triggered and a security check is performed. Referring further to FIG. 3, Application A2 calls SIO B, in message 310. This call causes a context switch in which a value (e.g.: context identifier) 311 that represent context B 206B is pushed onto stack 312. A value 313 that represent context A 206A, is already on the stack 312. Because there is a context change, one or more permission checks are performed. The permission checks may be transparent or programmatic for finer control.

Transparent permission checks may be automatically performed upon a context switch. For example, a transparent permission check is automatically performed when an application client invokes an SIO method of an application from a different context. The transparent permission check is requested by the firewall on behalf of the application against the calling client before performing the context switch, in one embodiment, For example, a firewall requests a permission check on behalf of Application B when Application A2 calls SIO B. In one embodiment, an access controller is invoked by the firewall to perform the transparent permission check. In one aspect, the transparent permission check allows for coarse-grained SIO access control since no permission target or action is specified.

To allow for finer grained-control of permission checks, an application may programmatically check permissions. For example, arrow 314 represents application B checking the permission of Application A. The programmatic permission check allows for fine-grained programmatic SIO permission check by allowing the developer to protect access to methods or code blocks, etc. A software method is provided to allow for an application to programmatically request a permission check against the calling code (client) when an SIO method is invoked, in accordance with an embodiment. This method accepts three arguments: the name or type of the permission, an optional permission target and an optional permission action, in one aspect. The name or type of the permission may be implicitly defined by the SIO (e.g., it may be derived from the SIO class name itself). Protection proxies implementing these programmatic permission checks based on some developer-provided metadata (e.g., annotations) may be generated by tools and installed along with the application. Thus, in one embodiment, the application developer does not need to code any permission check request into the application, but may provide equivalent instructions through metadata associated with the application.

Thus, referring to the case in FIG. 3, when Application A2 calls SIO B, SIO B can programmatically determine whether the calling application, Application A2, has permission. To make the determination, SIO B examines the stack 312 to determine the context of the calling application (A2). Then, SIO B determines if Application A2 is granted permission to access SIO B, based on the protection domain of Application A2. In one embodiment, an access controller is invoked by the application that wants the programmatic check (e.g., SIO B) to perform the permission check.

Referring further to FIG. 3, SIO B calls Application B, in message 316. Then, Application B calls the extension Library, in message 318. The extension library invokes a permission check, as represented by 341. In this case, the permission check is against application B. Thus, if the protection domain to which application B is associated has permission to access the library, access is granted.

The extension library calls the core library, in message 320. The call to the core library causes a value 315 that represent the RE context 206C to be pushed onto the stack 312. However, note that the security is not necessarily checked against the immediate calling code (application or library). For example, application B's permissions are checked to determine whether the extension library can access the core library. As with other permission checks, this is performed by determining the protection domain associated with the active context (e.g., context B 206B). In one embodiment, the core library invokes an access controller to perform the permission check. Thus, permission checks on RE protected functionalities may be requested by the RE itself and checked against the calling clients.

If application A2 calls the extension library (message 326), the extension library invokes a permission check, as represented by 351. In this case, the permission check is against application A2. Thus, if the protection domain to which application A is associated has permission to access the library, access is granted.

If the extension library then calls the core library (message 328), the permission is still checked against the protection domain associated with Application A2, as that was the active context when the message 328 was received. This permission check is represented by 361. The context may be switched to the context for the RE after receiving the message 328.

Finally, if application A2 calls the core library directly (message 330), then the permission is checked against the protection domain associated with Application A2, 371.

Thus, the permission checks are not based on the code itself, but on who signed the instance of the code or any other application authentication scheme. Referring again to FIG. 1A, the application bundle 104 is signed with credentials (e.g.: a certificate 112) that is authenticated against the protection domain credentials (e.g.: the protection domain's root certificate) 114. Therefore, checking the permission of two different instances of the same extension library code can have different results, based on the context the object was created in (the owning context).

Process Flow

Figure 4:
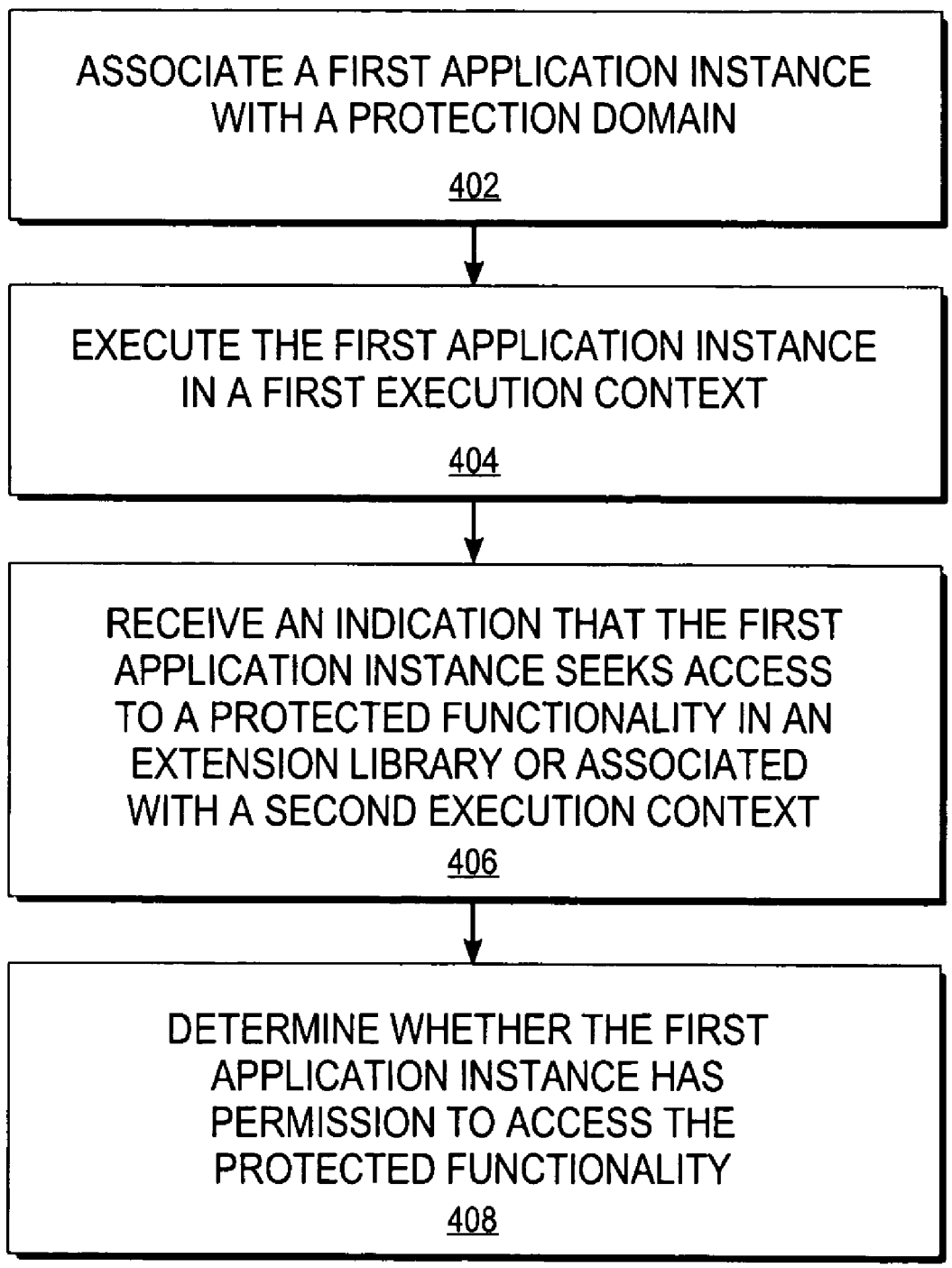
FIG. 4 is a flowchart illustrating a process of protection domain based security using context isolation, in accordance with an embodiment of the present invention.

FIG. 4 is a flowchart illustrating a process 400 of protection domain based security using context isolation, in accordance with an embodiment of the present invention. Step 402 is associating a first application instance with a protection domain based on credentials (e.g.: a certificate) associated with a set of application code that, when executed, gives rise to the application instance.

Step 404 is executing the first application instance in a first execution context on a platform, wherein the first execution context is isolated by a firewall from other execution contexts on the platform.

Step 406 is receiving an indication that the first application instance seeks access to protected functionality associated with a second execution context, wherein access to the protected functionality is allowed if the entity seeking access belongs to a protection domain in a set of one or more protection domains (granting the permission to access the above-mentioned protected functionality). The protected functionality may be exposed by a second application instance that is executing in the second context. The protected functionality may be associated with the RE context. For example, the protected functionality may be a core library or platform function. The protected functionality may also be in an extension library executing in the same context as the first application.

Step 408 is determining whether the first application instance has permission to access the protected functionality in response to receiving the indication in step 406. Step 408 includes determining the protection domain with which the first application instance is associated, and determining if the protection domain with which the first application instance is associated is in the set of one or more protection domains. Determining the protection domain may be based on the execution context in which the first application instance executes. For example, the platform may store an association between execution contexts and protection domains.

In one embodiment, the second application instance causes the determining whether the first application instance has permission to access the protected functionality. The second application instance may specify a set of one or more protection domain, wherein the calling application must belong to at least one of the protection domains order to access the protected functionality.

In one embodiment, a firewall associated with the second context causes the determining whether the first application instance has permission to access the protected functionality in response receiving the indication that the first application instance seeks access to protected functionality associated with a second execution context In one aspect, an extension library causes the determining whether the first application instance has permission to access the protected functionality. In still another aspect, the platform causes the determining whether the first application instance has permission to access the protected functionality.

Hardware Overview

Figure 5:
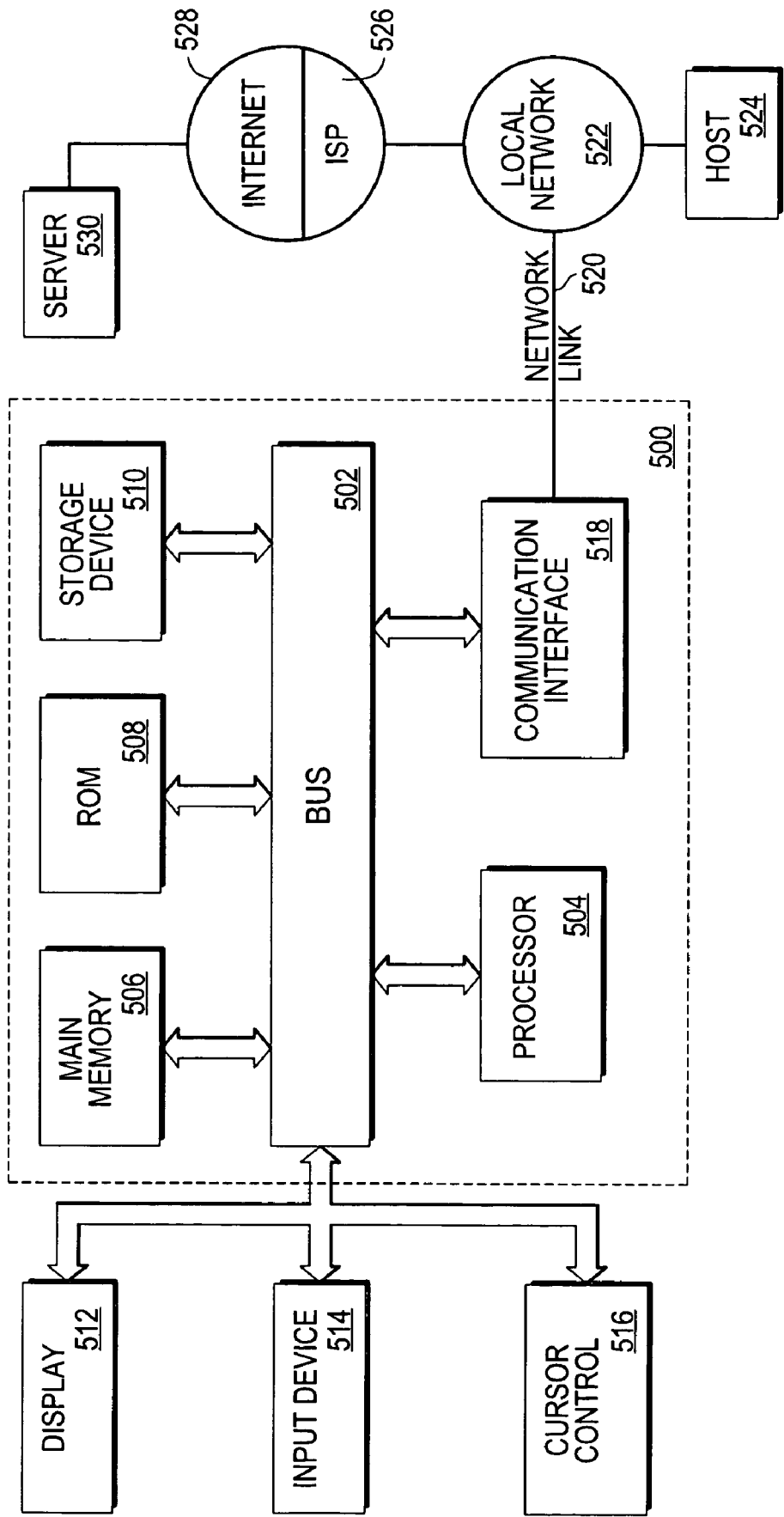
FIG. 5 is a block diagram that illustrates a computer system upon which an embodiment in accordance with the present invention may be implemented.

In one embodiment, at least some of the steps of process 400 of FIG. 4 take the form of sets of instructions that are executed by one or more processors. In one embodiment, at least some of the actions in FIG. 3 take the form of sets of instructions that are executed by one or more processors. FIG. 5 shows one possible embodiment of a platform for executing the instructions. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 515, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g., air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire, and fiber optic cables, including wires that comprise bus 502.

Common forms of machine-readable media include, for example, a floppy disk, a flexible disk, a hard disk, a magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line. Appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for providing security, the method comprising:
   binding, during installation, an application bundle to a protection domain based on a signor's certificate of the application bundle;

executing a first application instance of the application bundle in a first execution context, wherein the first execution context is isolated from other execution contexts by a firewall protecting the first execution context, wherein the first execution context is associated with the protection domain based on the application bundle being bound to the protection domain;

receiving, by a firewall protecting a second execution context, an indication that the first application instance seeks access to protected functionality associated with the second execution context, wherein the firewall protecting the second execution context allows access to the protected functionality if the entity seeking access belongs to a protection domain in a set of one or more protection domains; and in response to receiving the indication, determining, by the firewall protecting the second execution context, whether the first application instance has permission to access the protected functionality by:
    determining the protection domain associated with the first execution context; and
    determining if the protection domain associated with the first execution context is in the set of one or more protection domains.

2. The method of claim 1, wherein the protected functionality is exposed by a second application instance that is executing in the second execution context.

3. The method of claim 2, further comprising:
receiving an indication that the second application instance seeks access to another protected functionality associated with a third execution context, wherein access to the other protected functionality is allowed if the entity seeking access belongs to a protection domain in another set of one or more protection domains; and
determining whether the second application instance has permission to access the other protected functionality by:
    determining a protection domain associated with the second execution context; and
    determining if the protection domain associated with the second execution context is in the other set of one or more protection domains.

4. The method of claim 1, further comprising:
determining the first execution context in which the first application instance is executing.

5. The method of claim 1, wherein the protected functionality is associated with an extension library.

6. The method of claim 1, wherein the protected functionality is associated with at least one of protected data and a protected object.

7. A machine readable medium having stored thereon a set of instructions which, when executed by one or more processors, causes the one or more processors to perform the following operations:
bind, during installation, an application bundle to a protection domain based on a signor's certificate of the application bundle;
execute a first application instance of the application bundle in a first execution context, wherein the first execution context is isolated from other execution contexts by a firewall protecting the first execution context, wherein the first execution context is associated with the protection domain based on the application bundle being bound to the protection domain;
receive, by a firewall protecting a second execution context, an indication that the first application instance seeks access to protected functionality associated with the second execution context, wherein the firewall protecting the second execution context allows access to the protected functionality if the entity seeking access belongs to a protection domain in a set of one or more protection domains; and
in response to receiving the indication, determine, by the firewall protecting the second execution context, whether the first application instance has permission to access the protected functionality by:
    determine the protection domain associated with the first execution context; and
    determine if the protection domain associated with the first execution context is in the set of one or more protection domains.

8. The machine readable medium of claim 7, wherein the protected functionality is exposed by a second application instance that is executing in the second execution context.

9. The machine readable medium of claim 8, wherein the set of instructions comprise instructions which, when executed by one or more processors, causes the one or more processors to perform the following further operations:
receive an indication that the second application instance seeks access to another protected functionality associated with a third execution context, wherein access to the other protected functionality is allowed if the entity seeking access belongs to a protection domain in another set of one or more protection domains; and
determine whether the second application instance has permission to access the other protected functionality by:
    determine a protection domain associated with the second execution context; and
    determine if the protection domain associated with the second execution context is in the other set of one or more protection domains.

10. The machine readable medium of claim 7, wherein the set of instructions comprise instructions which, when executed by one or more processors, causes the one or more processors to perform the following further operations:
determine the first execution context in which the first application instance is executing.

11. The machine readable medium of claim 7, wherein the protected functionality is associated with protected data.

12. The machine readable medium of claim 7, wherein the protected functionality comprises a protected object.

* * * * *